(12) United States Patent
Cherukupalli et al.

(10) Patent No.: US 10,972,045 B2
(45) Date of Patent: Apr. 6, 2021

(54) PIVOTING MEMBERS FOR A SOLAR ARRAY

(71) Applicant: FTC Solar, Inc., Austin, TX (US)

(72) Inventors: Nagendra Cherukupalli, Cupertino, CA (US); Milo Zabala, Concord, CA (US); Rechel Cruz, Centennial, CO (US); Larry Wong, San Francisco, CA (US)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 16/522,095

(22) Filed: Jul. 25, 2019

(65) Prior Publication Data

US 2020/0076357 A1    Mar. 5, 2020

Related U.S. Application Data

(60) Provisional application No. 62/727,212, filed on Sep. 5, 2018.

(51) Int. Cl.
  *H02S 20/32*      (2014.01)
  *F24S 30/422*     (2018.01)
  *H02S 20/30*      (2014.01)

(52) U.S. Cl.
  CPC ............. *H02S 20/32* (2014.12); *F24S 30/422* (2018.05); *H02S 20/30* (2014.12)

(58) Field of Classification Search
  USPC .......... 248/214, 218.4, 219.1, 219.2, 226.11, 248/227.3, 227.4, 316.1, 70, 122.1, 125.7, 248/125.9, 229.2, 229.25, 229.24, 49, 62, 248/63, 65, 74.4, 74.1; 136/246, 243, 136/244, 251
  See application file for complete search history.

(56) References Cited

U.S. PATENT DOCUMENTS

| | | | | |
|---|---|---|---|---|
| 3,141,545 A | * | 7/1964 | Holland, Jr. ........... | B65G 33/04 198/673 |
| 3,359,351 A | * | 12/1967 | Bender .................... | F16L 59/22 264/46.9 |
| 2003/0047007 A1 | * | 3/2003 | Baumoel ................. | G01F 1/662 73/861.27 |
| 2014/0140755 A1 | * | 5/2014 | Clavijo Lumbreras ..... | F24S 30/425 403/57 |
| 2015/0059826 A1 | * | 3/2015 | Reed ....................... | F24S 25/00 136/246 |
| 2015/0207452 A1 | * | 7/2015 | Werner .................. | F24S 30/425 136/246 |
| 2016/0218663 A1 | * | 7/2016 | Werner .................. | F24S 30/425 |
| 2017/0234580 A1 | * | 8/2017 | Worden ................. | F24S 30/425 126/606 |

FOREIGN PATENT DOCUMENTS

WO       2013085776 A2     6/2013

* cited by examiner

*Primary Examiner* — Alfred J Wujciak
(74) *Attorney, Agent, or Firm* — Armstrong Teasdale LLP (57) ABSTRACT

Pivoting members for pivoting a solar array mounted to a torque rail and tracking systems that include such pivoting members are disclosed. The pivoting member may include a liner between a rotating inner member and the outer housing of the pivoting member to reduce friction during pivoting of the solar array.

19 Claims, 9 Drawing Sheets

PIVOTING MEMBERS FOR A SOLAR ARRAY

CROSS-REFERENCE TO RELATED APPLICATION

This application claims the benefit of U.S. Provisional Patent Application No. 62/727,212, filed Sep. 5, 2018, which is incorporated herein by reference in its entirety.

FIELD OF THE DISCLOSURE

The field of the disclosure relates generally to pivoting members for pivoting a solar array such as a solar array mounted to a torque rail. The pivoting member allows the array to pivot to reduce the angle of incidence between the array and the sun. In some embodiments, the pivoting member comprises a liner to reduce friction during rotation of the array.

BACKGROUND

Solar arrays are devices that convert light energy into other forms of useful energy (e.g., electricity or thermal energy). One example of a solar array is a photovoltaic array that converts sunlight into electricity. Some photovoltaic arrays are configured to follow the path of the sun to minimize the angle of incidence between incoming sunlight and the photovoltaic array.

Photovoltaic array assemblies may include a mount that supports the photovoltaic array and connects it to an anchoring structure. A pivoting device allows the array to pivot relative to the anchoring structure. Conventional pivoting devices may be characterized by relatively high friction which is overcome by actuators with relatively high load rating which increases the cost and size of the actuator. Such larger actuators may also interfere with the range of motion of the solar array and/or may cause shading of the array. Other tracking system designs are configured to reduce the distance between the center of gravity of the array and the center of motion to reduce the actuator load. Other designs use engineered plastic components which are relatively expensive.

A need exists for pivoting devices and tracking systems for rotating photovoltaic arrays that are characterized by reduced friction during rotation of the array.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a pivoting member for pivoting a solar array mounted to a torque rail. The pivoting member includes a rotatable member configured to couple to the torque rail and enable the torque rail to rotate about a rotational axis. The rotatable member includes an outer housing and an inner member disposed within the outer housing. The inner member is configured to rotate relative to the outer housing. The rotatable member includes a liner disposed between the outer housing and the inner member. A support is connected to the rotatable member for supporting the rotatable member.

Another aspect of the present disclosure is directed to a tracking system for adjusting a photovoltaic array. The tracking system includes a torque rail for supporting the photovoltaic array and a pivoting member. The pivoting member includes a rotatable member configured to couple to the torque rail and enable the torque rail to rotate about a rotational axis. The rotatable member includes an outer housing and an inner member disposed within the outer housing. The inner member is configured to rotate relative to the outer housing. The inner member has an opening and the torque rail is received in the opening. The rotatable member includes a liner disposed between the outer housing and the inner member.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
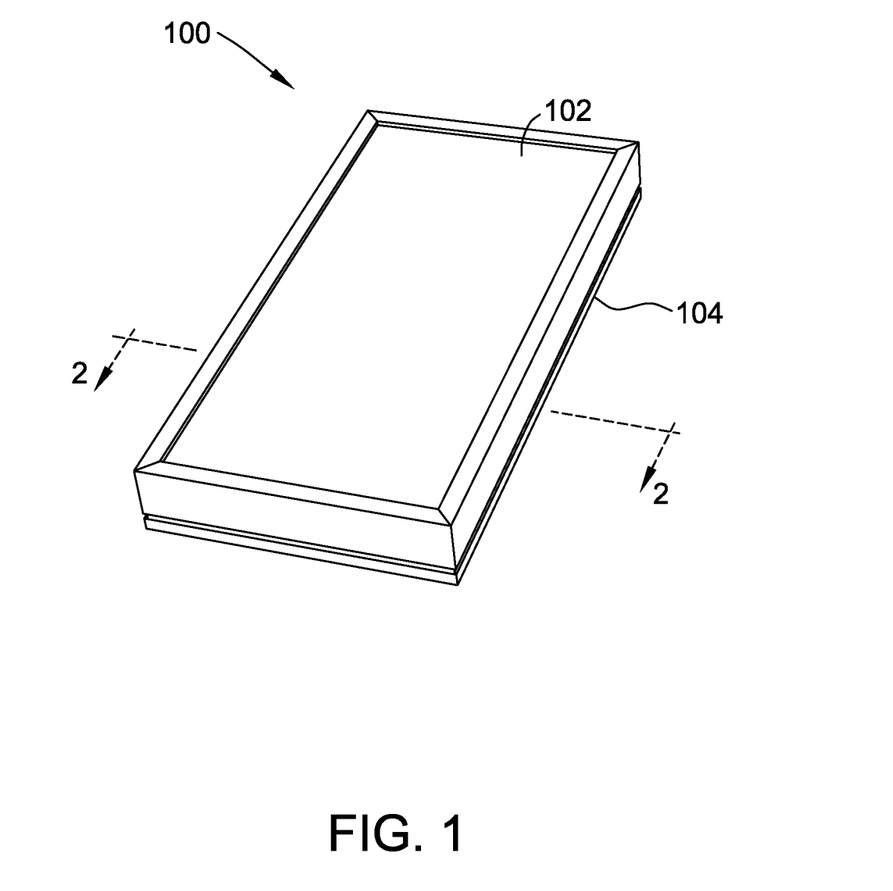
FIG. 1 is a perspective view of a solar array.

An embodiment of a solar array 100 is shown in FIG. 1. The solar array 100 includes a solar panel 102. The solar panel 102 includes a top surface 106 (FIG. 2) and a bottom surface 108. Edges 110 extend between the top surface 106 and the bottom surface 108. Solar panel 102 is rectangular-shaped. In other embodiments, solar panel 102 may have another shape that allows the solar array to function as described herein.

Figure 2:
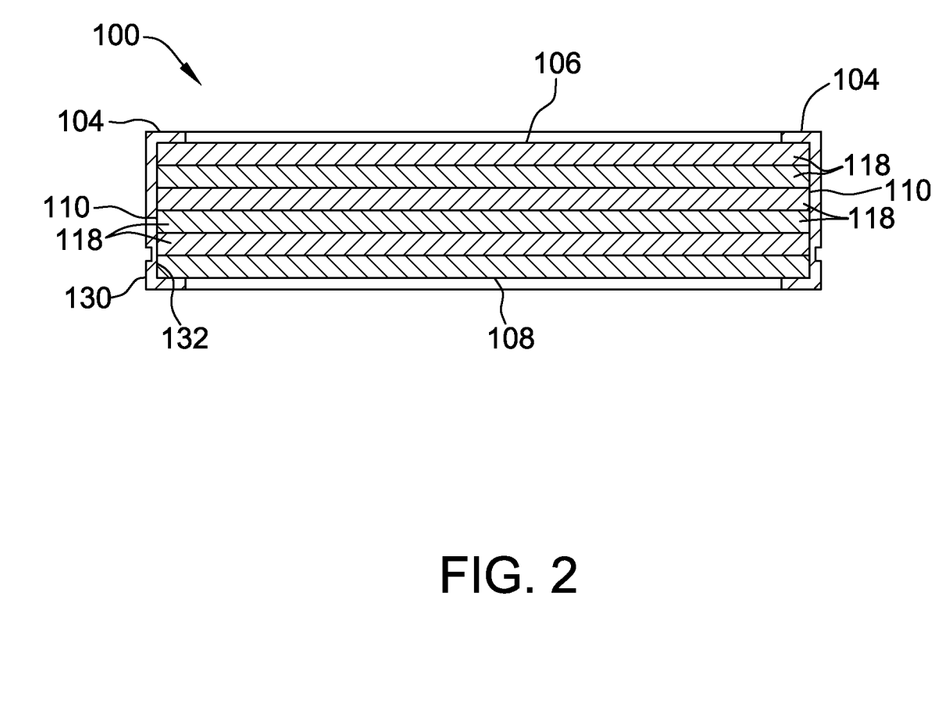
FIG. 2 is a cross-sectional view of the solar array of FIG. 1 taken along line A-A of FIG. 1.

A frame 104 circumscribes and supports the solar panel 102. The frame 104 is coupled to the solar panel 102, for example as shown in FIG. 2. The frame 104 protects the edges 110 of the solar panel 102. The frame 104 includes an outer surface 130 spaced from the solar panel 102 and an inner surface 132 adjacent to the solar panel 102. The outer surface 130 is spaced from, and substantially parallel to, the inner surface 132. The frame 104 may be made of any suitable material providing sufficient rigidity including, for example, metal or metal alloys, plastic, fiberglass, carbon fiber and the like. In some embodiments, the frame is made of aluminum, such as 6000 series anodized aluminum.

In the illustrated embodiment, the solar array 100 is a photovoltaic array. The solar panel 102 has a laminate structure that includes a plurality of layers 118. Layers 118 include, for example, glass layers, non-reflective layers, electrical connection layers, n-type silicon layers, p-type silicon layers, backing layers and combinations thereof. In other embodiments, the solar panel 102 may have more or fewer layers 118 than shown in FIG. 2, including only one layer. The solar array 100 may include a plurality of photovoltaic modules with each module being made of photovoltaic cells.

In some embodiments, the solar array 100 is a thermal collector that heats a fluid such as water. In such embodiments, the solar panel 102 may include tubes of fluid which are heated by solar radiation. While the present disclosure may describe and show a photovoltaic array, the principles disclosed herein are also applicable to a solar array configured as a thermal collector unless stated otherwise.

Figure 3:
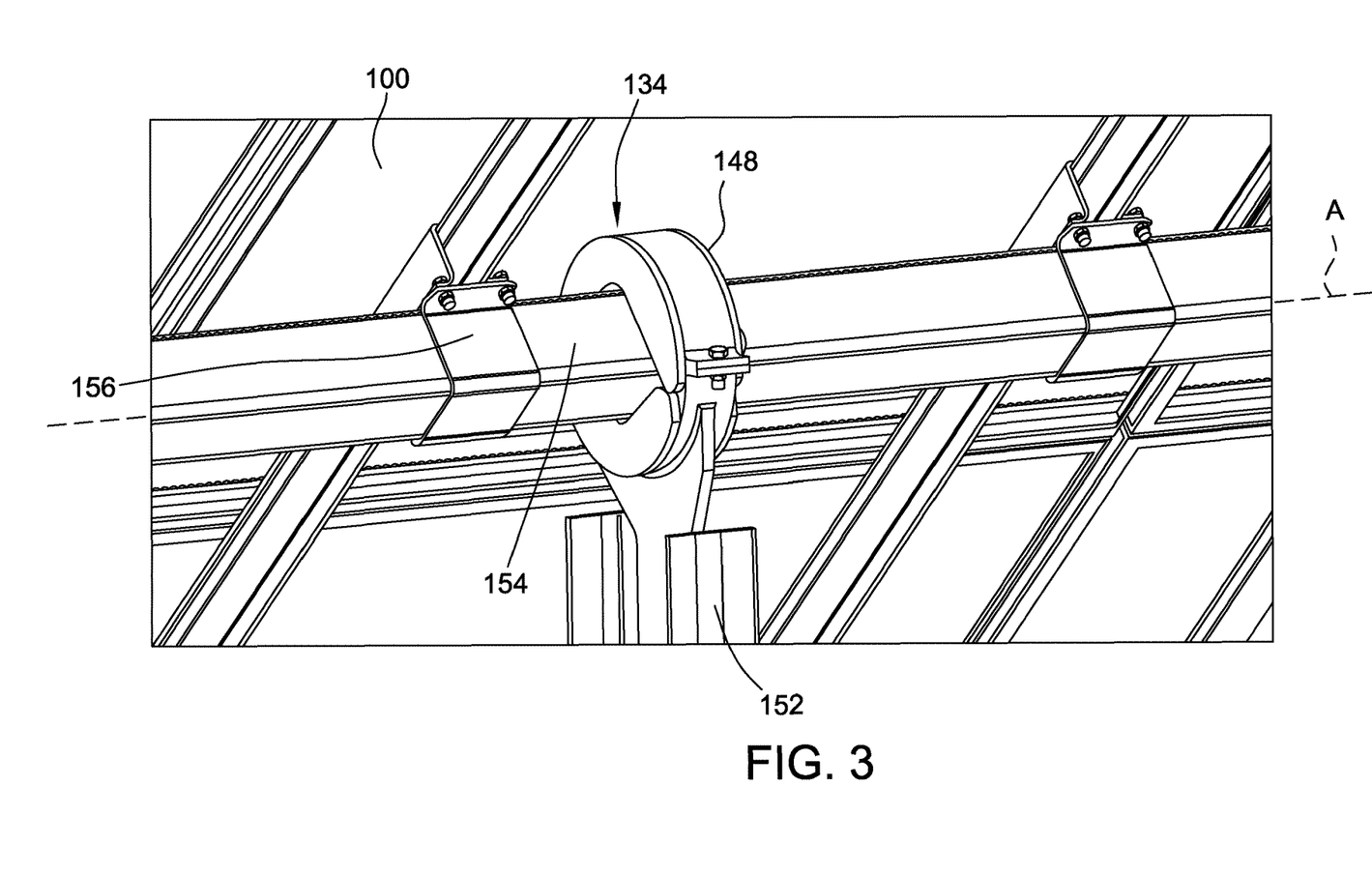
FIG. 3 is a perspective view of a pivoting member and a solar array connected thereto.

FIG. 3 shows an embodiment of a pivoting member 134 for pivoting the solar array 100. The pivoting member 134 is connected to a torque rail 154 that supports the array 100. For example, fasteners 156 may be used to connect the array 100 to the torque rail 154. The pivoting member 134 includes a rotatable member 148 (FIG. 3) that is configured to couple to the torque rail 154 and enables the torque rail 154 to rotate about a rotational axis A that extends through the torque rail 154. The pivoting member 134 is supported by and connected to a support 152.

Figure 4:
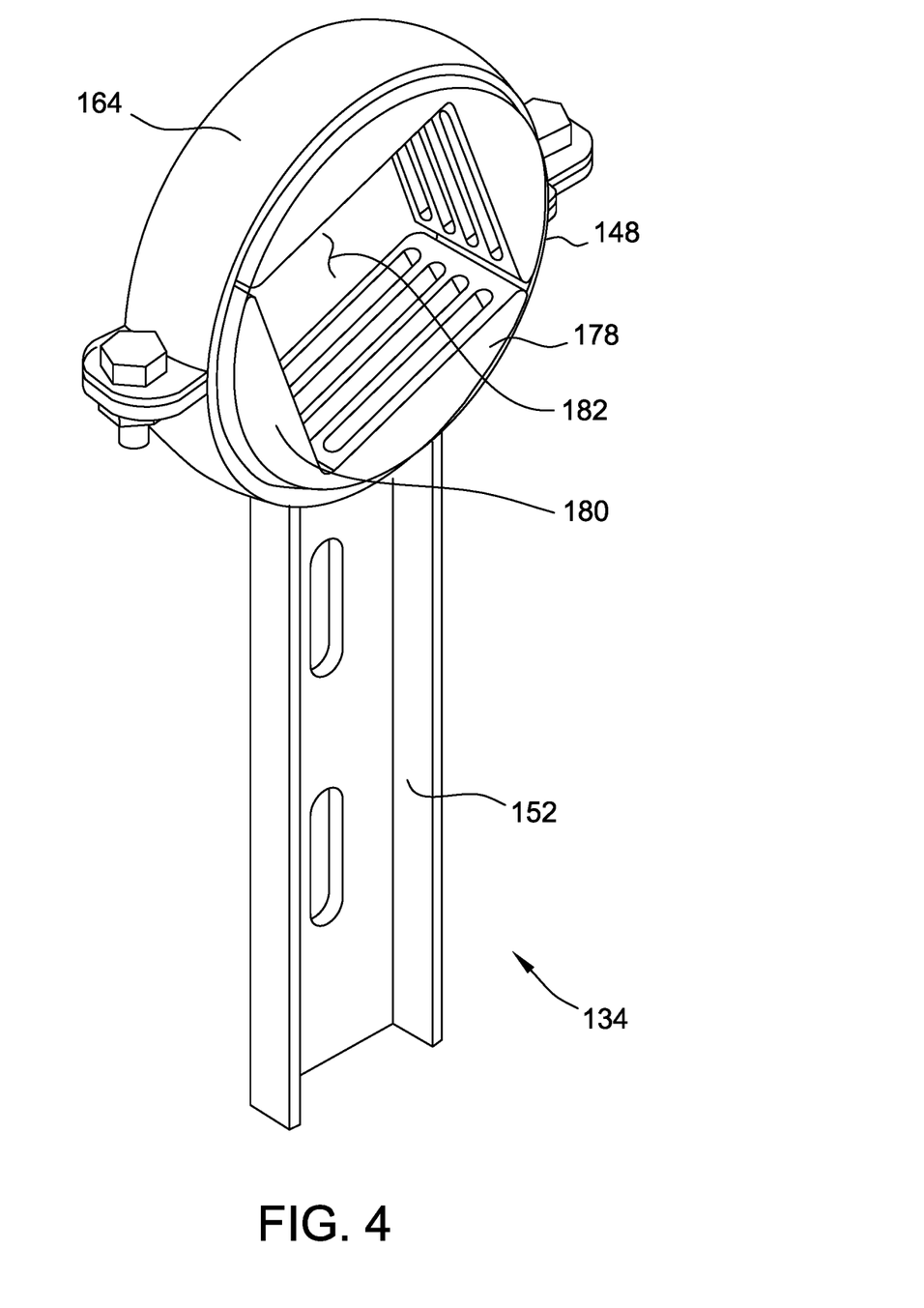
FIG. 4 is a perspective view of the pivoting member.
Figure 5:
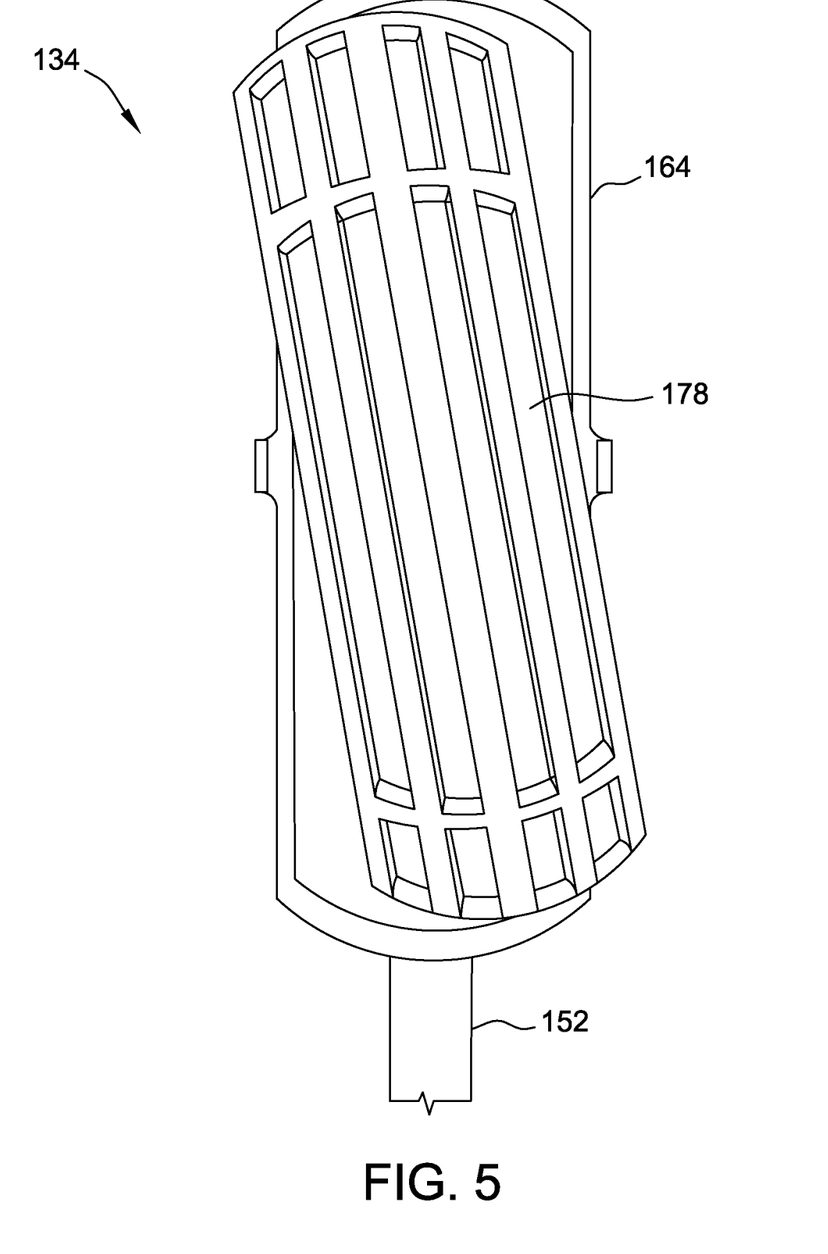
FIG. 5 is a cross-section view of the pivoting member having an inner member tilted with respect to an outer housing.

Referring now to FIG. 4, the rotatable member 148 includes an outer housing 164 and a rotatable inner member 178 disposed within the outer housing 164. The outer housing 164 is connected to the support 152. The inner member 178 rotates within the outer housing 164 to allow the array to pivot. The inner member 178 includes an opening 182 through which the torque rail 154 (FIG. 3) is received. As shown in FIG. 5, the inner member 178 and outer housing 164 may be dome-shaped to maintain the inner member 178 within the housing 164 while allowing the inner member 178 to tilt within limits with respect to the housing 164.

In the illustrated embodiment, the rotatable member 148 is cylindrical and includes a first side a second side opposite the first side (the first side 180 being shown in FIG. 4). The outer housing 164 defines an outer circumference of the rotatable member 148. In other embodiments, the rotatable member has a different shape (e.g., rectangular). In the illustrated embodiment, the torque rail 154 and opening 182 have a rectangular shaped cross-section. In other embodiments, the torque rail 154 and opening 182 have other shaped cross sections, for example, circular, triangular, polygonal and the like.

Figure 6:
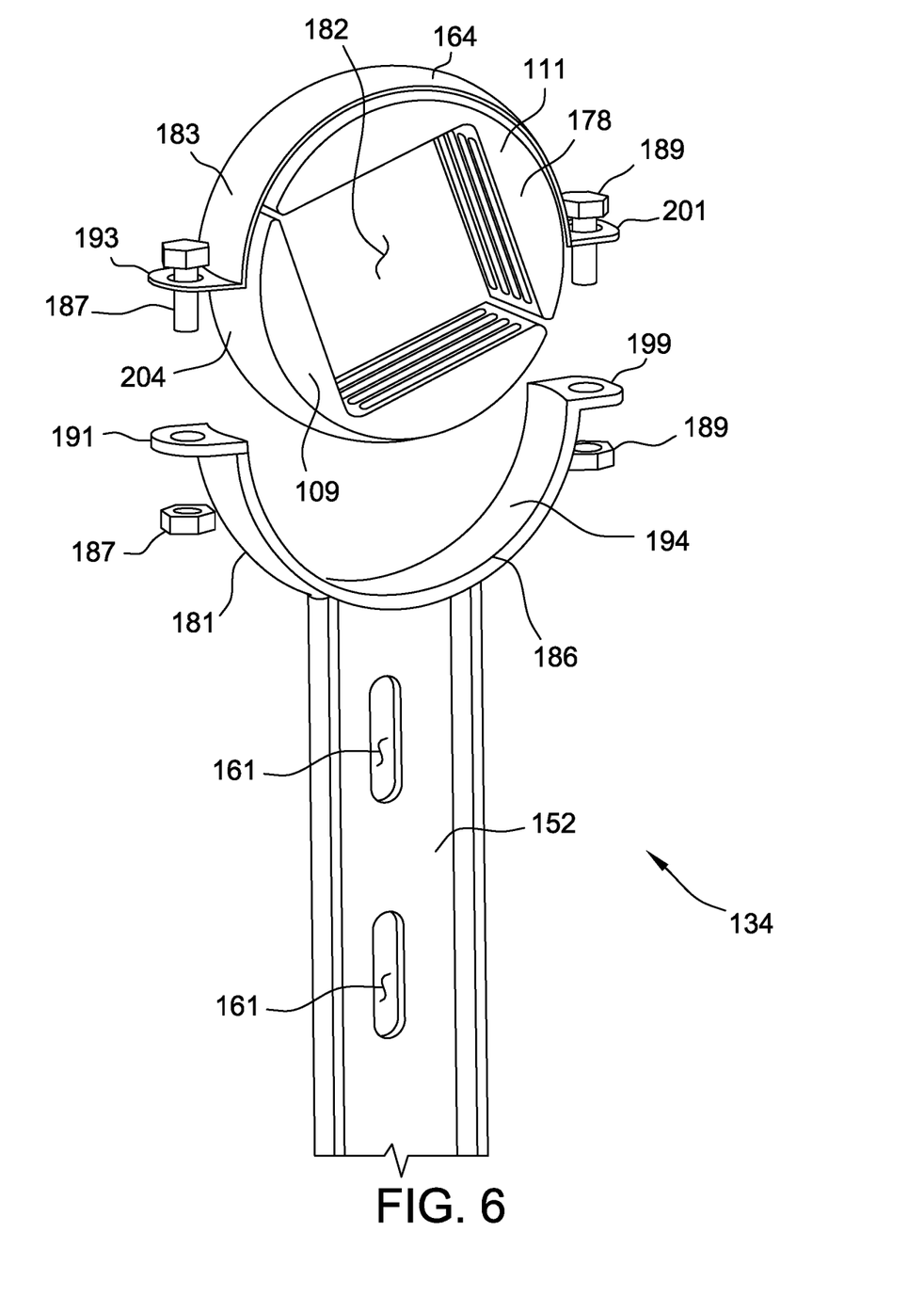
FIG. 6 is an exploded view of the pivoting member.

The outer housing 164 includes first and second brackets 181, 183 that may be removably connected by use of fasteners 187, 189 shown as bolt and nuts that extend through respective openings in first bracket flanges 191, 193 and second bracket flanges 199, 201. The inner member 178 includes first and second separable segments 109, 111. To assemble the pivoting member 134, the first segment 109 is placed atop the first bracket 181 of the outer housing 164. The second segment 111 and the second bracket 183 are positioned to rest on the first segment 109 and first bracket 181, respectively. The fasteners 187, 189 are tightened to secure the second bracket 183 to the first bracket 181 and to hold the second inner member segment 111 to the first inner member segment 109.

A liner 186 is disposed between the outer housing 164 and the inner member 178 to reduce friction between the outer housing 164 and the inner member 178 during rotation of the inner member 178. The liner 186 may be made of a material that reduces the coefficient of friction between the inner member 178 and the portion of the pivoting member 134 that remains stationary (i.e., the outer housing 164) and, in some embodiments, reduces the coefficient of friction by at least 3, at least 4, at least 5, at least 6 or at least 7 times relative to pivoting members that do not include the liner 186. In some embodiments, the liner 186 is made of polytetrafluoroethylene. The liner 186 may be molded and/or bonded to an inner surface 194 of the outer housing 164 or may be molded to the outer surface 204 of the inner member 178. In some embodiments, the outer housing 164 is made of metal (e.g., steel) and/or the inner member 178 is made of a polymer (e.g., a molded polymer).

In some embodiments (e.g., use of a polytetrafluoroethylene liner), friction between the inner member 178 and the outer housing 164 during pivoting of the array is reduced by at least about 25%, at least about 35% or even at least about 50%.

The liner 186 may be disposed around the entirety of the inner member 178 or may be in one or more discontinuous segments that are disposed around a portion of the inner member 178.

In some embodiments, the pivoting member 134 also includes ball bearings that allow the inner member 178 to move relative to the outer housing 164.

Figure 8:
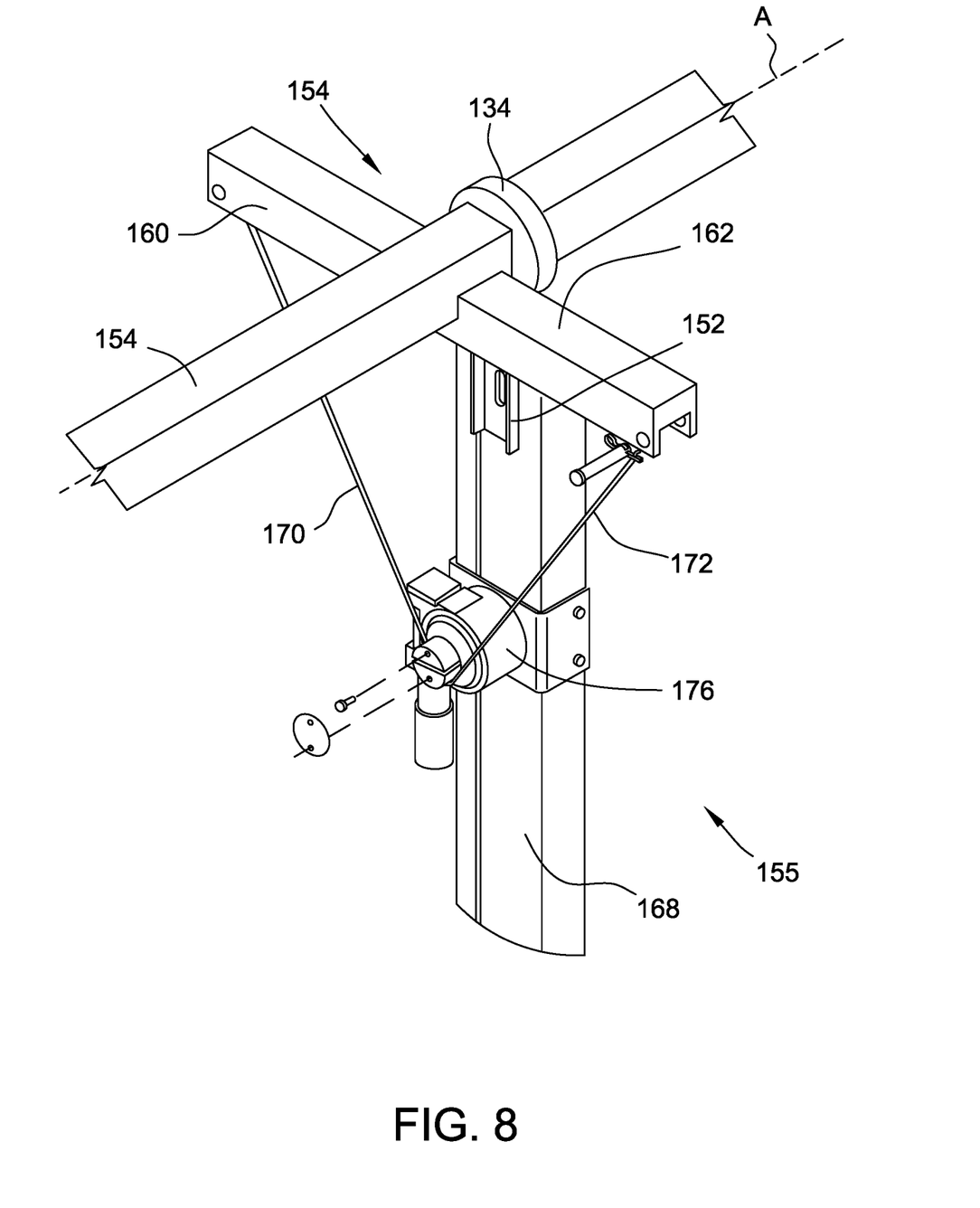
FIG. 8 is a perspective view of a tracking system for rotating a solar array.

In some embodiments and as shown in FIG. 8, the pivoting member 134 may be part of a tracking system 155 for adjusting the position of the solar array 100 (FIG. 3). Such a tracking system 155 may adjust the position of the array 100 based on relative movement of the sun over a course of a day and/or based on seasonal variations in the position of the sun. The tracking system 155 may include the pivoting member 134 and mounting frame 151 that supports the solar array 100 (FIG. 1). The mounting frame 151 includes a torque rail 154 to which the solar array 100 is connected.

In some embodiments, the tracking system 155 includes an actuator 176 for rotating the solar array 100. In the illustrated embodiment, the actuator 176 is a slew drive (e.g., having a rotating member that is driven by a rotating shaft connected to a motor such as in a worm drive) that is connected to first and second links 170, 172. The links 170, 172 are connected at their other end to first and second mounting members 160, 162, shown as cantilevered mounting arms. Rotation of the actuator 176 causes one of the first and second links 170, 172 to retract (e.g., to be pulled down toward the actuator 176) while the other link 170, 172 extends (e.g., moves upward and away from the actuator 176). In this manner, the actuator 176 pivots the mounting members 160, 162 in opposite directions (i.e., one pivoting up and the other pivoting down) causing the torque rail 154 to rotate. In the illustrated embodiment, the links 170, 172 are cables or wires. In other embodiments, the links 170, 172 may be chains or rocker arms or the like.

The actuator 176 and tracking system 155 are exemplary and other actuators and tracking systems that are capable of pivoting the solar array 100 (e.g., such as an actuator mounted directly to the torque rail 154 or that is gear operated or a linear actuator mounted below the torque rail) may be used unless stated otherwise.

Figure 7:
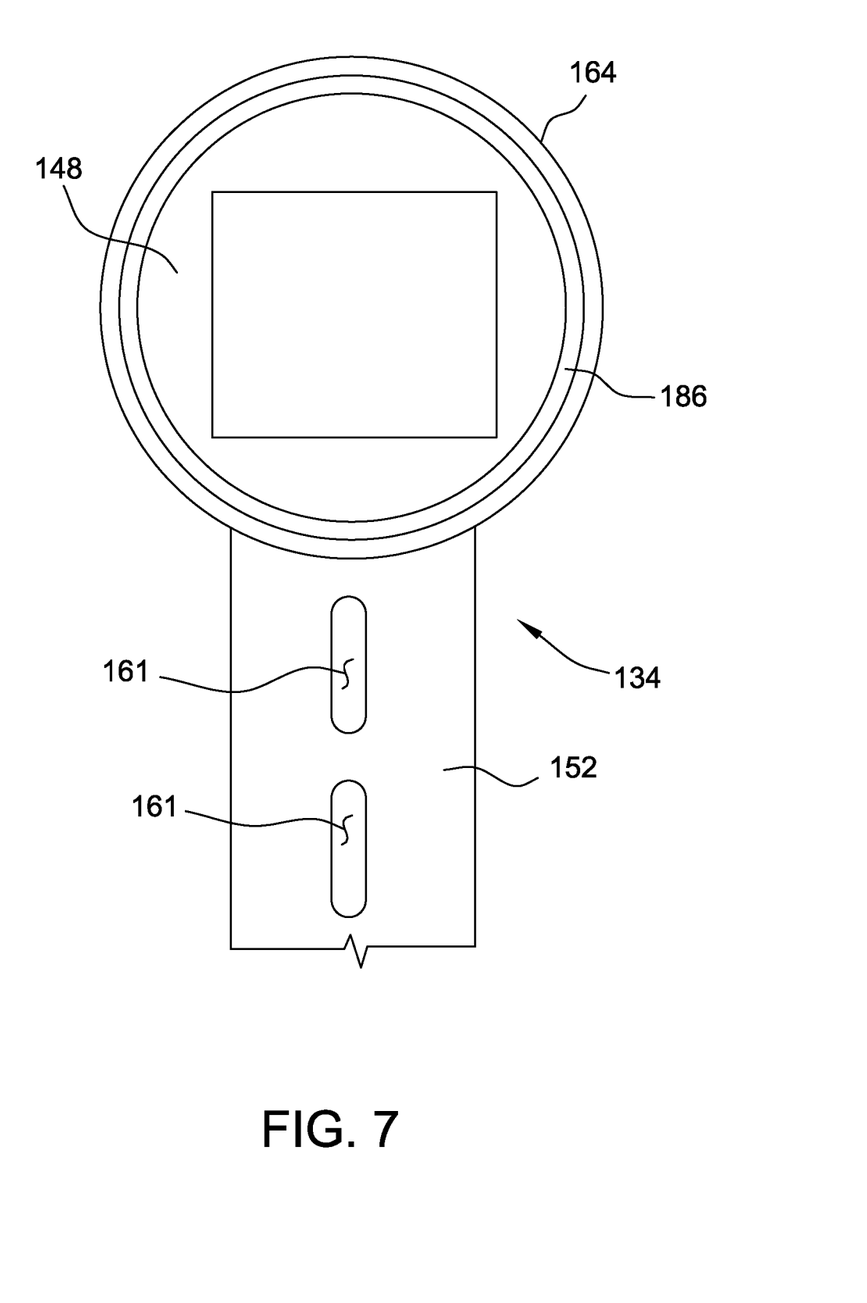
FIG. 7 is a front view of the pivoting member.
Figure 9:
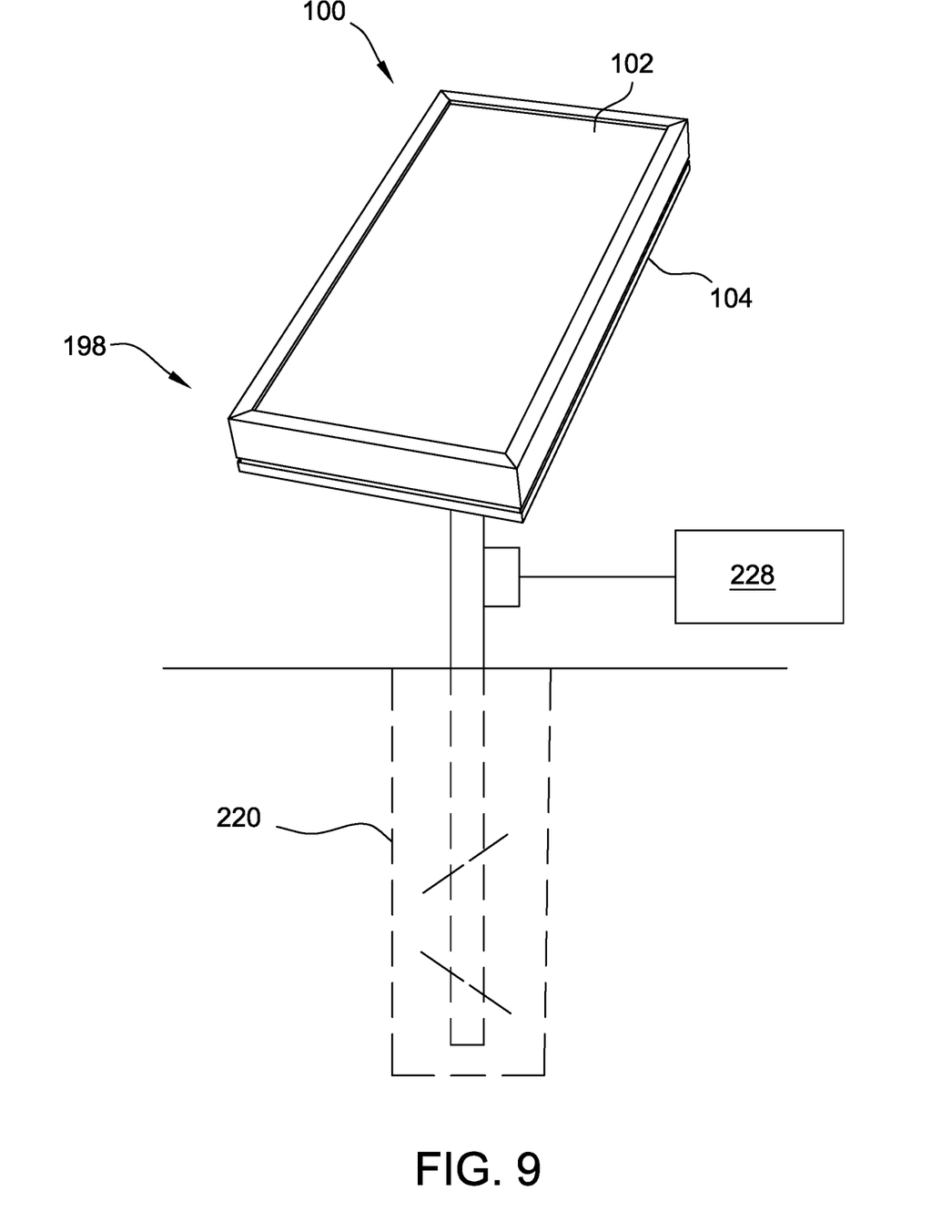
FIG. 9 is a perspective view of a solar array assembly.

The support 152 of the pivoting member 134 is connected to a column 168 such as by fasteners (e.g., bolts and nuts) that extend through openings 161 (FIGS. 6-7) in the support 152 to allow the solar array 100 to pivot with respect to the column 168. In the illustrated embodiment, the column 168 is an I-beam post. Other support columns may be used in other embodiments (e.g., a tubular column). The column 168 is connected to and anchors the solar array 100 a base 220, shown as a foundation in FIG. 9. Generally, any base 220 that anchors the array 100 may be used such as a frame member (e.g., a horizontal rail that supports multiple arrays with one or more posts securing the rail to the ground), stanchion, ram, pier, ballast, post or the like. The base 220 may be a foundation which encases a portion of the column 168 or may include brackets, fasteners or the like that connect to the column 168. The solar array may be ground mounted as shown in FIG. 9 or may be connected to another structure which supports the array (e.g., roof-top applications). The base 220, tracking system 155, and array 100 may be part of a solar array assembly 198.

In some embodiments, the tracking system 155 includes a controller 228 (FIG. 9) that is communicatively connected to the actuator 176. The controller 228 adjusts the tracking system 155 such that the solar array 100 follows the path of the sun, such as during movement of the sun over a course of a day. In some embodiments, the tracking system 155 positions the solar array 100 based on seasonal variations in the position of the sun. The solar array assembly 198 may be a single axis tracker or a dual axis tracker with the torque rail 154 defining at least one axis of rotation of the array. The other axis of rotation may be a vertical axis with rotation being achieved by a rotatable coupling and, optionally, a second actuator.

In some embodiments, the above described systems and methods are electronically or computer controlled. The embodiments described herein are not limited to any particular system controller or processor for performing the processing tasks described herein. The term "controller" or "processor", as used herein, is intended to denote any machine capable of performing the calculations, or computations, necessary to perform the tasks described herein. The terms "controller" and "processor" also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the disclosure, as will be understood by those skilled in the art. The terms "controller" and "processor", as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Compared to conventional pivoting members for pivoting a solar array mounted to a torque rail, the pivoting members of the present disclosure have several advantages. In embodiments in which the pivoting member includes a liner between the rotatable inner member and the outer housing such as a polytetrafluoroethylene liner, friction between the inner member and the outer housing during rotation of the array may be reduced (such as by at least about 25%, about 35%, or about 50% or more). Reducing friction during pivoting of the array allows the actuator load to be reduced which reduces cost and size of the actuator.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A pivoting member for pivoting a solar array mounted to a torque rail, the pivoting member comprising:
   a rotatable member configured to couple to the torque rail and enable the torque rail to rotate about a rotational axis, the rotatable member comprising:
      an outer housing;
      an inner member disposed within the outer housing, the inner member configured to rotate relative to the outer housing; and
      a liner disposed between the outer housing and the inner member, the liner being bonded to the outer housing; and
   a support connected to the rotatable member for supporting the rotatable member; and wherein the outer housing is dome-shaped and the inner member is dome shaped to maintain the inner member within the housing while allowing the inner member to tilt within limits with respect to the housing.

2. The pivoting member as set forth in claim 1 wherein the rotatable member is cylindrical, the outer housing defining an outer circumference of the rotatable member.

3. The pivoting member as set forth in claim 2 wherein the liner is disposed around an entirety of the inner member.

4. The pivoting member as set forth in claim 2 wherein the liner is one or more discontinuous segments that are disposed around a portion of the inner member.

5. The pivoting member as set forth in claim 1 wherein the inner member comprises an opening for receiving the torque rail.

6. The pivoting member as set forth in claim 1 wherein the liner is made of polytetrafluoroethylene.

7. The pivoting member as set forth in claim 1 wherein the outer housing is made of metal.

8. The pivoting member as set forth in claim 1 wherein the inner member is made of a polymer.

9. The pivoting member as set forth in claim 1 wherein the outer housing comprises first and second brackets, the first and second brackets being removably connected.

10. The pivoting member as set forth in claim 9 wherein the first and second brackets are connected by fasteners.

11. The pivoting member as set forth in claim 9 wherein the first bracket is connected to the support.

12. The pivoting member as set forth in claim 1 wherein the rotatable member comprises first and second separable segments.

13. A tracking system for adjusting a photovoltaic array comprising:
   a torque rail for supporting the photovoltaic array; and
   a pivoting member comprising a rotatable member configured to couple to the torque rail and enable the torque rail to rotate about a rotational axis, the rotatable member comprising:
      a dome-shaped outer housing;
      a dome-shaped inner member disposed within the outer housing, the inner member configured to rotate relative to the outer housing, the inner member having an opening, the torque rail being received in the opening; and
      a liner disposed between the outer housing and the inner member, the liner being bonded to the outer housing wherein the housing allows the inner member to tilt within limits with respect to the housing.

14. The tracking system as set forth in claim 13 further comprising an actuator configured to rotate the torque rail.

15. The tracking system as set forth in claim 13 wherein the outer housing is made of a metal and the liner is made of polytetrafluoroethylene.

16. A solar array assembly comprising:
   the tracking system as set forth in claim 13; and
   a solar array mounted to the tracking system.

17. The solar array assembly as set forth in claim 16 wherein the pivoting member comprises a support connected to the outer housing that supports the rotatable member, the support being connected to a column that anchors the solar array to a base.

18. The pivoting member as set forth in claim 1 wherein the inner member is configured to fully surround a torque rail.

19. The tracking system as set forth in claim 13 wherein the inner member fully surrounds the torque rail.

* * * * *